United States Patent [19]

Padgett et al.

[11] 4,206,323
[45] Jun. 3, 1980

[54] DUAL TONE MULTIFREQUENCY SIGNAL RECEIVER

[75] Inventors: Robert S. Padgett, Melbourne; Roger L. Ross, Indialantic; Edgar B. Dickinson, Satellite Beach, all of Fla.

[73] Assignee: Harris Corporation, Melbourne, Fla.

[21] Appl. No.: 938,345

[22] Filed: Aug. 31, 1978

[51] Int. Cl.² ........................................... H04M 1/50
[52] U.S. Cl. ............................................. 179/84 VF
[58] Field of Search ............ 179/84 VF; 340/171 R, 340/171 PF, 167 R; 324/78 D; 328/138, 140

[56] References Cited

U.S. PATENT DOCUMENTS

| | | | |
|---|---|---|---|
| 3,912,869 | 10/1975 | Ullakko | 179/84 VF |
| 4,016,370 | 4/1977 | Laoteppitaks et al. | 179/84 VF |

Primary Examiner—Bernard Konick
Assistant Examiner—Joseph A. Popek
Attorney, Agent, or Firm—Craig and Antonelli

[57] ABSTRACT

A system and method for detecting the presence of a tone burst and identifying the frequency signals contained within the tone burst of a dual tone multifrequency system includes an arrangement for applying the tone burst to a plurality of filter circuits that are tuned to respectively different frequencies including those frequency signals of which the tone burst may be comprised. The outputs of the filter circuits are monitored and signals representative of the filter outputs are compared with a first set of reference criteria, at a prescribed interval of time after beginning the monitoring of the outputs of the filter circuits. A history profile for each of the signal outputs of the filter circuits is maintained and in order to accurately identify a valid tone pair, an analysis is made of the level signal outputs of the filter circuits. Specifically, upon the monitored outputs of the filter circuits satisfying the first set of reference criteria and being also identified as those which satisfy a prescribed history profile, there are produced identification codes indicating the frequency signals which correspond to a valid tone burst.

42 Claims, 8 Drawing Figures

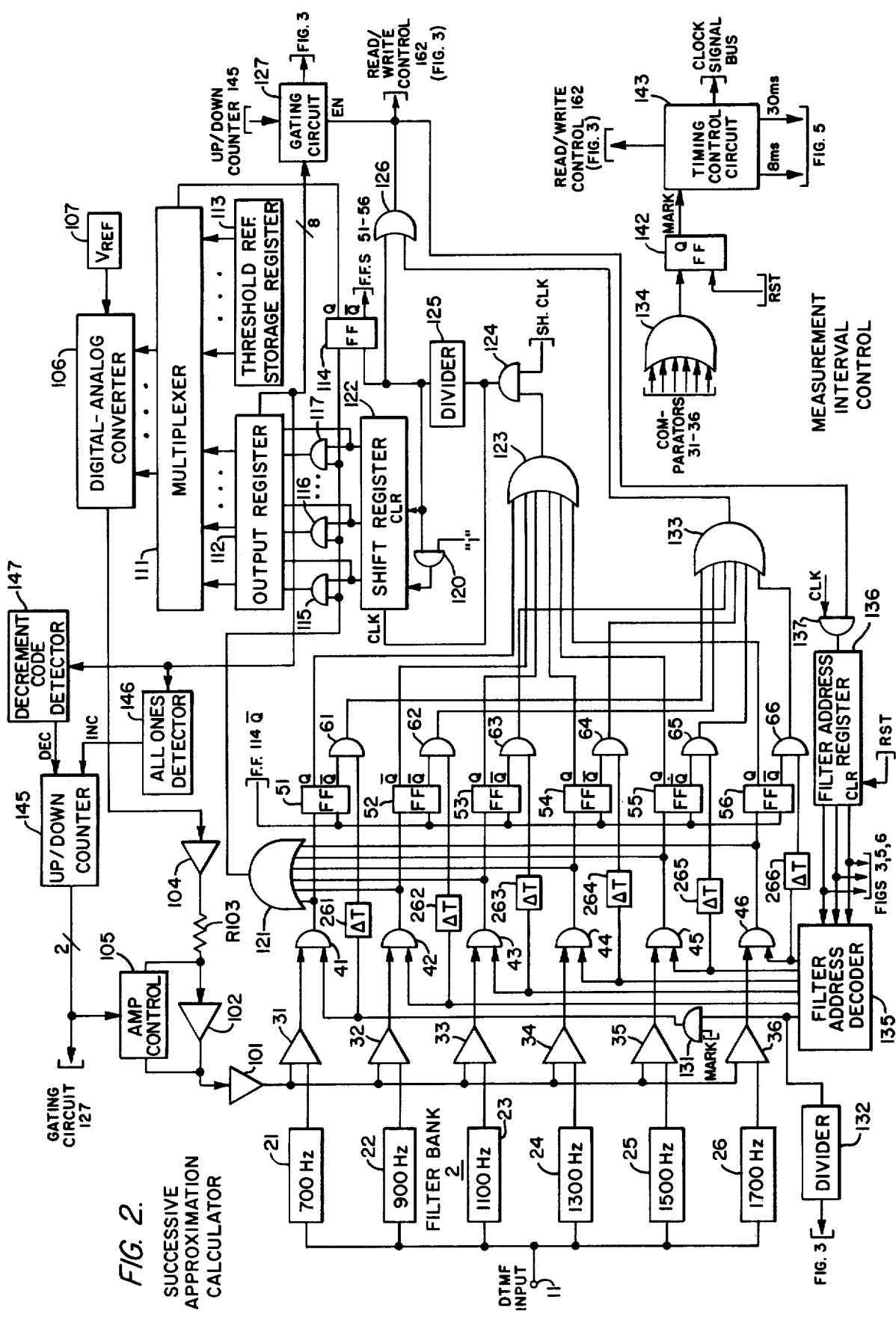

UP-ALGORITHM CALCULATOR

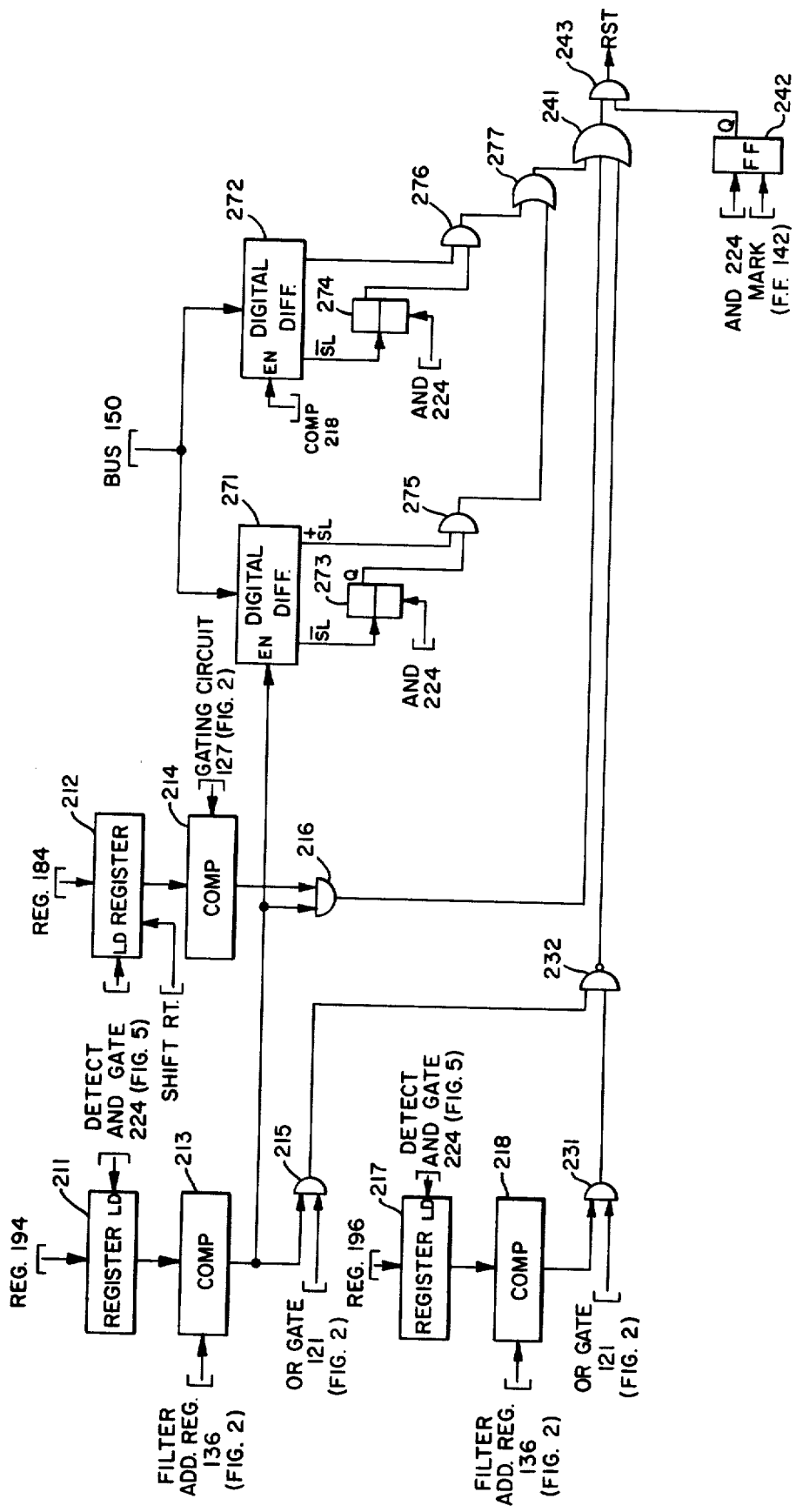

DUAL TONE MULTIFREQUENCY SIGNAL RECEIVER

FIELD OF THE INVENTION

The present invention relates in general to telecommunication systems, and is particularly directed to a scheme for identifying multifrequency tone signals that are employed for signalling purposes in such systems.

BACKGROUND OF THE INVENTION

A commonly employed signalling technique in present day telecommunication systems involves multifrequency pulsing. Current multifrequency pulsing systems, such as those employing R2 and No. 5 CCITT-defined signals, utilize various combinations of two-out-of-six basic tone frequencies in the voice band. For example, No. 5 CCITT-defined signals consist of six tone frequencies from 700 to 1700 Hz spaced 200 Hz apart. These six frequencies may be combined in pairs to create up to fifteen dual tone or dual frequency combinations. Various combinations of the tone pairs may represent transmitted digits, zero through nine, so that ten digits and five other symbols or signals may be represented by the fifteen dual tone pairs. Since the tone pairs occupy the normal voice band, the signals are normally transmitted over regular talking channels.

Concomitant with the utilization of dual tone multifrequency (DTMF) signalling systems has been the implementation of various techniques for detecting the tone pulses. These techniques include both analog and digital detection schemes through which tones are filtered and subjected to a comparison-evaluation process. For example, there are a number of tone detectors which contain respective analog filters for each of the frequencies of interest and a common gain control coupling arrangement for adjusting the level of the inputs to the respective filters or the levels in the filter channels themselves. Such detectors are undesirably sensitive to noise since they effectively respond to the instantaneous values of their inputs. The U.S. Pat. Nos. to Cowpland 3,795,775, Hanson 3,812,432, and Alaily 3,875,347 contain illustrative descriptions of such detectors. Another type of detector is that which effectively operates as a zero-crossing detector, typically configured in a digital fashion to count repetitive series of clock pulses over a set of timing intervals and indicating detection of a tone if the clock/count corresponds to a synchronization code reference. Reference may be had to the U.S. Pat. Nos. to Pitroda 3,710,028, Hammad 4,016,371, Beeman et al 3,760,269, or Friend 3,537,001 for exemplary descriptions of such detector arrangements. Similarly, the U.S. Pat. to Sharp et al No. 4,021,653 describes a tone detector filter arrangement that is configured substantially of all digital components.

A further type of system is a hybrid configuration containing both channel filters and digital processing components, associated with high frequency tones and with a separate set of low frequency tones. These latter systems attempt to achieve a more accurate identification of valid tone pairs by employing persistence and tone code comparison criteria. This latter approach is considered to provide a technique that is more accurate and less subject to the influence of noise that may be in the form of signal or component variations. Examples of such systems are described in the U.S. Pat. to Laoteppitaks et al Nos. 4,016,370 and Ullakko 3,912,869. Unfortunately, these patented detector arrangements do not process the signals according to the individual frequencies employed in the DTMF system, but segregate an incoming signal into respective high and low frequency channels for processing. As a result, continuous monitoring of each of the tone channels employed in the system is not possible, thereby reducing the accuracy of the tone pair identification. In addition, flexibility in the choice of tone pairs is limited by preassigned upper and lower channel separation.

SUMMARY OF THE INVENTION

The present invention is directed to an improved hybrid combination of a frequency separation scheme and digital processing components which continuously monitor the outputs of all the tone filters over a prescribed observation interval. This observation interval includes a tone-increasing period and a tone-decreasing period. Normally, after rectification and smoothing, the output of a filter tuned to a particular one of the frequencies that may be transmitted increases during the persistence of the tone burst and then decreases exponentially upon its termination. In DTMF signalling, the frequencies of a tone pair are transmitted simultaneously and continuously over the same burst interval, so that the level of each filter output should follow approximately the same characteristics during a tone measurement interval. Pursuant to the invention, the outputs of a plurality of filter units, respectively corresponding to each of the tones of the DTMF system, are monitored on a continuous basis for the presence of signal power above the noise floor threshold of the filter channels. Upon the output of any filter unit exceeding this threshold, timing circuitry is enabled to initiate a tone measurement interval. During this interval, digital processing circuitry monitors the signal contents of the respective filter channels by coupling the filter unit outputs to the comparator inputs of a successive approximation digital-analog converter. The output of the converter controls the gain of amplifier circuitry through which the reference voltage for the respective channel comparators is supplied. Through successive sampling and integration of the contents of the respective filter channels, a history profile of the signal levels of the tone channels is maintained during the tone detection interval. Digital processing components are advantageously used for this purpose. After a first prescribed interval of time subsequent to the beginning of the measurement interval, the levels of the respective channels are compared with validity criteria. If the criteria are satisfied, the measurement interval is continued up to a second prescribed interval of time subsequent to the beginning of the measurement interval, at which time the channel signal levels are again compared with validity criteria. These criteria require that the same two tones that were originally detected are tones that have been detected for a prescribed number of sample periods and that the level of the tones has not decreased consistently. In addition, the level of the lower level tone must be within a certain level of the upper level tone and in excess of the noise floor reference by a prescribed amount. If these criteria are met, the upper and lower tones that cause these criteria to be satisfied are identified as the dual tone pair.

Upon the termination of a tone burst, the outputs of the filter units associated with the tone pair will begin to decrease or drop down toward the noise floor reference value. During this "tone down" interval the filter unit outputs are compared with another set of criteria for the purpose of resetting the system to begin looking for a new tone burst. These criteria include: the signal level of the upper tone dropping below 3 dB of its peak value; the 2/6 tone pair being no longer distinguishable; the upper level tone dropping below the noise floor; and the slope of the signal level of either the upper or lower tone changing from negative to positive. If any of these criteria are satisfied during the tone down interval, the system is reset and begins monitoring the filter unit outputs for initiating a new tone measurement interval corresponding to a new tone burst.

BRIEF DESCRIPTION OF THE DRAWINGS

FIG. 2 is a detailed schematic diagram of the configuration of the filter bank and successive approximation calculator of the receiver shown in FIG. 1;

FIG. 6 depicts the configuration of the down-algorithm calculator of the receiver.

DETAILED DESCRIPTION

Figure 1:
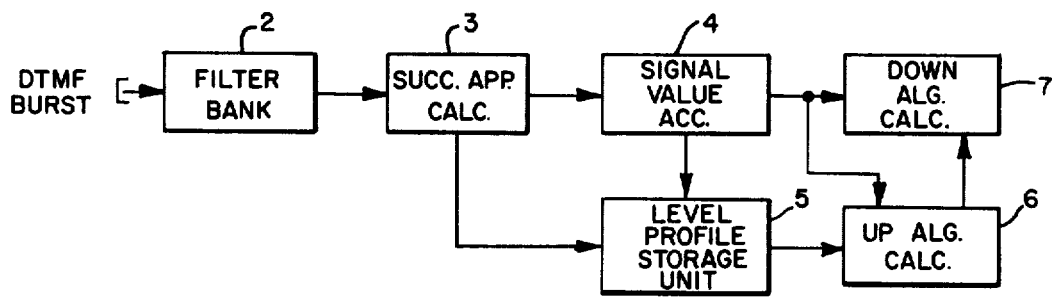
FIG. 1 is a block diagram illustration of the basic components of a dual tone multifrequency receiver.

Referring now to FIG. 1, which is a block diagram illustration of the basic components of which the present invention is comprised, input signals from a communication link over which dual tone multifrequency signals are transmitted are supplied to a filter bank 2. Filter bank 2 may be comprised of a plurality of narrowband filter units, and using CCITT No. 5 assignments in an exemplary DTMF scheme, filter bank 2 may be comprised of six separate filter units respectively tuned to frequencies of 700 Hz, 900 Hz, 1100 Hz, 1300 Hz, 1500 Hz, and 1700 Hz. It is to be noted that the multifrequency detector scheme according to the present invention is not limited to any particular set of frequencies or to a specific number of frequencies. The CCITT No. 5 formed has been described merely for the purpose of explaining an exemplary embodiment of the present invention. Within filter bank 2, each filter unit (hereinafter simply referenced as "filter") rectifies and smooths an input tone burst at the proper frequency and produces a DC voltage output. These DC voltage outputs are coupled in parallel to a successive approximation calculator 3. Successive approximation calculator 3 monitors the outputs of each of the filters of filter bank 2 and produces respective digital codes representative of samples of the filter outputs. For a true tone pair burst applied to filter bank 2, the values represented by two of these codes will increase with time for the duration of the burst, in correspondence with the increase in level of the outputs of those filters of filter bank 2 which are tuned to the tones of the incoming pair.

In order to reduce the effects of noise, a prescribed number of successive values of the filter output voltages are encoded over a sample interval and these code representations are integrated or averaged by a signal value accumulator 4. Digital code values representative of these signal averages are supplied from accumulator 4 to respective up and down-algorithm calculators 6 and 7, and to a level profile storage unit 5. Level profile storage unit 5 examines the average values of the filter outputs derived by accumulator 4 and stores a successive number of indications, for successive averages, of the behavior of the tone level outputs of the filters within filter bank 2. This successive number of indications may represent a prescribed number of the most recent average values, for each filter output, supplied by sample value accumuator 4. The behavior information stored in level profile storage unit 5 indicates whether the output of the respective filters have not consistently decreased over some finite interval and is employed as one criterion for detection of a valid tone burst.

Up-algorithm calculator 6, which is coupled to signal value accumulator 4 and level profile storage unit 5, is configured of the digital logic necessary to determine, on the basis of a plurality of factors (to be explained in detail below), whether the monitored outputs of filter bank 2 are representative of a valid 2/6 tone burst, and to identify the particular tones or frequencies in the burst. For this purpose, up-algorithm calculator 6 effectively observes the filter outputs, the DC voltage values of which are upgoing or increasing over the tone burst interval, and identifies those two tones which make up a valid DTMF burst. Down-algorithm calculator 7, which is coupled to signal value accumulator 4 and up-algorithm calculator 6, monitors the decreasing levels of the outputs of the filters tuned to the two frequencies of the terminated DTMF burst that have identified by up-algorithm calculator 6 and indicates when the levels have dropped sufficiently to indicate a loss of tone or the termination tone-down condition, so that the system may be reset to look for and monitor a new tone burst.

FIGS. 2 through 6 illustrate, in detail, the individual components of which the functional units shown in block diagram formed in FIG. 1 are comprised. These functional units will be described in detail below, followed by a description of the operation of the overall system. In the description and illustration of the detailed configuration of the components of the system, it should be understood that, for the most part, single conductor leads between elements have been shown for the purpose of simplifying the drawings; and the appropriate number of conductors are intended thereby as necessary to complete the required digital signals between circuit elements. Similarly, simple gate designations may comprise the appropriate number of gate elements as necessary to couple digital words or codes between different portions of the system.

FILTER BANK-SUCCESSIVE APPROXIMATION CALCULATOR (FIG. 2)

As was explained above, the communication link that is to be monitored for the presence and identity of DTMF tone burst is coupled to a filter bank comprised of a plurality of narrowband filters. For this purpose, the link may be coupled to an input terminal 11 which is connected in common to a plurality of narrowband filters 21 through 26 each of which is tuned to a respective frequency. Using No. 5 CCITT signalling as an exemplary tone assignment, filters 21 through 26 are tuned to the frequencies 700 Hz, 900 Hz, 1100 Hz, 1300 Hz, 1500 Hz, and 1700 Hz, respectively. Each of filters 21 through 26 filters and rectifies an input signal, and produces a DC voltage output in response to a tone burst of the frequency of that respective filter. The DC voltage outputs of filters 21 through 26 are coupled to respective inputs of a successive approximation calculator. These inputs are connected to first inputs of respective comparators 31 through 36, which may be configured as operational amplifiers, connected to toggle from one saturation output voltage to another when the filter output to which a comparator is connected exceeds a reference input voltage supplied, in common, by amplifier 101, to second inputs of comparators 31 through 36.

Figure 3:
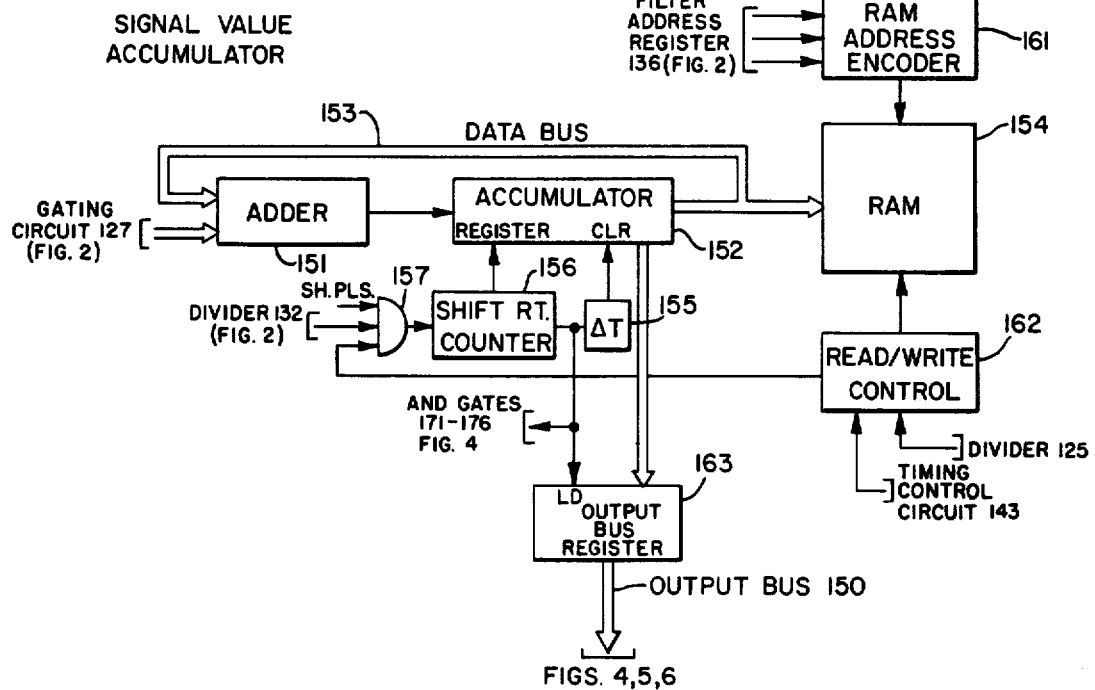
FIG. 3 shows the schematic configuration of a signal value accumulator.
Figure 4:
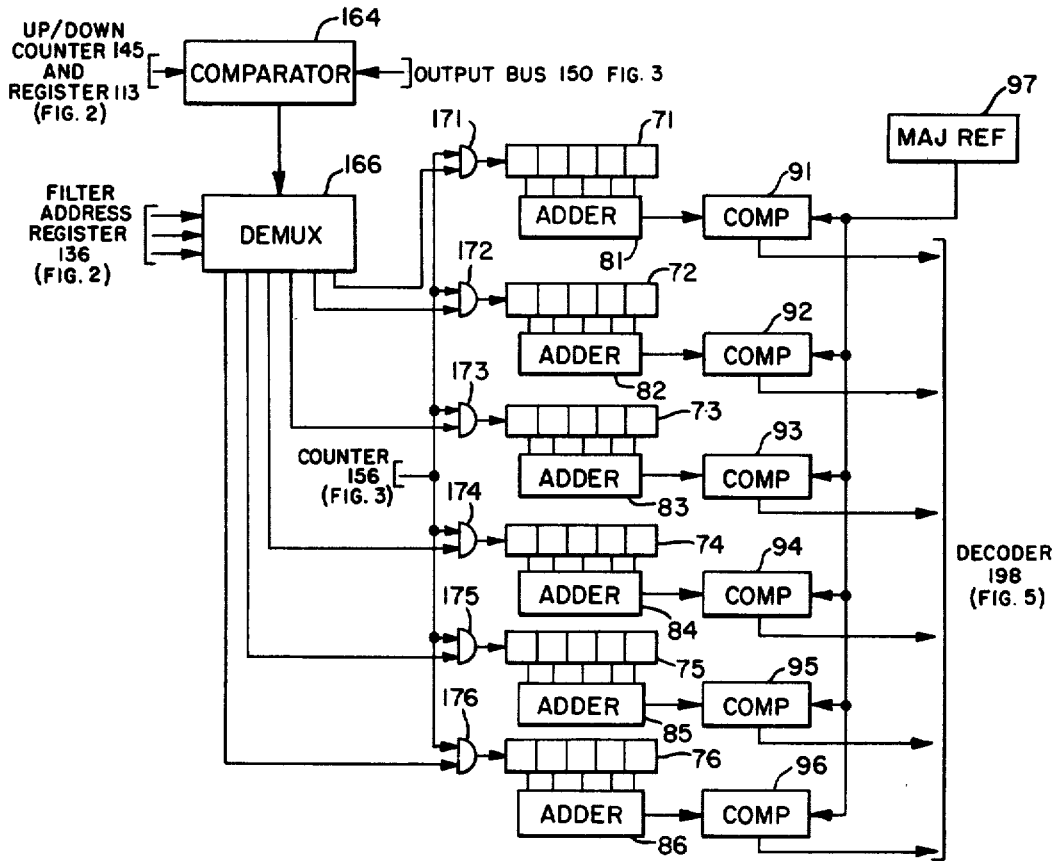
FIG. 4 depicts the configuration of a level profile storage unit.

The reference voltage supplied by amplifier 101 is derived from a digital-to-analog (D-A) converter 106, the output of which is coupled via amplifier 104, summing resistor 103, and variable gain amplifier 102 to the input of amplifier 101. D-A converter 106 scales a reference analog voltage, supplied by reference voltage source 107, by a binary code coupled via multiplexer 111 from one of output register 112 and noise threshold reference storage register 113. The selected binary code stored in register 113, set by an appropriate external address device (not shown), corresponds to a noise floor reference voltage or the output of the narrowband filters produced during quiescent condition, e.g. during the time the multifrequency link is down. These binary codes may be eight bit codes, thereby providing a scale capacity of 0–255 for D-A converter 106. It should be understood, however, that the code size may be any appropriate size which satisfies the resolution requirements of the system user, so that a code of more or less than eight bits/register is possible within the scope of the present invention. A switch control input to multiplexer 111 is coupled to the Q output of flip-flop 114. As will be explained below, when the Q output of flip-flop 114 is "1", the eight bits from output register 112 are coupled by multiplexer 111 to D-A converter 106; when the Q output of flip-flop 114 is "0", the eight bit inputs of D-A converter 106 are derived from noise threshold reference storage register 113. The contents of output register 112 are coupled via a set of eight AND gates, three of which (115, 116, 117) are shown, coupled to the respective stages of an eight stage shift register 122. Another input of each of these eight AND gates is derived by OR gate 121. OR gate 121 has six inputs coupled to the outputs of six respective AND gates 41 through 46, one input of each of which is coupled to the output of a respective one of the above-described comparators 31 through 36. A second input of each of AND gates 41 through 46 is supplied by filter address decoder 135. In addition, the second input of AND gate 41 is coupled to an output of decoder 135 through AND gate 131, a second input of which receives a control or MARK enabling signal, to be described below. Filter address decoder 135 is coupled to the stages of a filter address register (counter) 136, the contents of which are incremented from 000 to 101 and recycled to 000 in response to application of clock pulses coupled via AND gate 137 to the count input thereof. Filter address register 136 and decoder 135 are employed to selectively address one of AND gates 41 through 46 and, thereby the output of one of comparators 31 through 36 that is coupled to an individual filter of filter bank 2. During the interval that an individual one of AND gates 41 through 46 is selectively addressed by filter address decoder 135, a successive approximation of the DC voltage level output of the associated filter is produced in digital format in output register 112 as the contents of shift register 122 are successively shifted or advanced by shift clock pulses applied from AND gate 124. The digital code is then coupled from output register 112 to signal value accumulator 4 (FIG. 3) at the end of the successive approximation interval for that sample of that particular filter, as will be described more fully below. The contents of output register 112 are then cleared by a reset signal line (not shown) to prepare register 112 for a subsequent successive approximation. The shift pulses from AND gate 124 are also coupled to a divide-by-eight counter or divider 125, the output of which is coupled to one input of OR gate 126, the reset input of flip-flop 114, and read/write control circuit 162 (FIG. 3). The output of divider 125 is also used to clear shift register 122 and load a "1", via gate 120, in the first stage of register 122 at the beginning of each successive approximation calculation. The set input of flip-flop 114 is coupled to the output of OR gate 121, so that the eight bit coupling connection provided by multiplexer 111 will be controlled by the output of OR gate 121 and the output of divide-by-eight counter 125. A second input of OR gate 126 is coupled to the output of OR gate 133, the output of OR gate 126 enabling gating circuit 127, so as to couple the contents of output register 112 and the contents of an up/down counter 145 to signal value accumulator 4 (FIG. 3) and AND gate 137.

The address line corresponding to filter 21 or AND gate 41 is coupled to divider 132. Divider 132 produces an output for each successive group of eight address signals from decoder 135 and is used to identify one complete sampling interval (i.e. eight samples for each filter output) so that the successive samples of each filter for that interval may be averaged and applied to further portions of the system. The six address line outputs of filter address decoder 135 are also coupled via delays 261 through 266 to a first input of each of AND gates 61 through 66. Second inputs of these AND gates 61 through 66 are coupled to the $\bar{Q}$ outputs of flip-flops 51 through 56 the set inputs of which are coupled to the outputs of AND gates 41 through 46. The outputs of AND gates 61 through 66 are coupled via OR gate 133 to AND gate 137, to control the address advance or incrementing of the contents of filter address register 136 by the clock input to AND gate 137. The Q outputs of flip-flops 51 through 56 are coupled via OR gate 123 to one input of AND gate 124 which receives at its other input clock pulses for advancing the contents of shift register 122 during a successive approximation interval. In the above-described configuration, the states of flip-flops 51 through 56 are used to initiate each successive approximation interval to be carried out, the selective addressing of AND gates 41 through 46 and, thereby the reading of the DC voltage outputs of filters 21 through 26. Flip-flops 51 through 56 are reset by the $\bar{Q}$ output of flip-flop 114.

The reference voltage supplied by D-A converter 106 is gain scaled by an amplitude control circuit 105 that is coupled in the resistor feedback path of operational amplifier 102, and which responds to a two bit code supplied by up/down counter 145. Up/down counter 145 is a two bit counter that is initially set at 00 and may be incremented up to a maximum value of 11 or back down to its minimum value 00, depending upon the DC voltage level outputs of filters 21 through 26 during a tone burst evaluation interval. The binary two bit code from up/down counter 145 is used to selectively control one of four available feedback resistor elements contained in amplitude control unit 105. The values of these resistors may be R/16, R/8, R/4, and R/1, respectively gated into the feedback path of operational amplifier 102 by control unit 105 in response to the codes 00, 01, 10, and 11 respectively, R being the value of summing resistor 103. These additional multiplier code bits are combined with the eight bits of output register 112 to define a ten bit binary word representative of the DC voltage level calculated by successive approximation for each respective filter of interest. At the beginning of each tone measurement interval, the contents of up/down counter 145 are set at the two-bit code 00, to provide a 1/16 scaling factor for the voltage output of D-A converter 106, and thereby provide a maximum sensitivity or minimum threshold voltage for each of comparators 31 through 36. The contents of output register 112, which may be coupled in either serial or parallel format through gating circuit 127 to signal value accumulator 4 (FIG. 3), are monitored by an all ones detector 146 and a decrement-code detector 147, the outputs of which are used to respectively increment and decrement the two bit code stored in up/down counter 145, and thereby establish the maximum sensitivity for comparators 31 through 36 without causing a saturation condition of comparators 31 through 36 which would prevent an accurate successive approximation calculation to be effected.

The outputs of comparators 31 through 36 are further coupled via OR gate 134 to the set input of flip-flop 142, the reset input of which is coupled to receive a system-reset signal. The Q output of flip-flop 142 is coupled to a timing control circuit 143, which operates under the control of a system clock and the Q output of flip-flop 142 to generate selected timing signals that are coupled to appropriate control inputs of various portions of the system, to be described more fully below. For this purpose, timing control circuit may be configured of a suitable counter and combinational logic coupled to its output for generating suitable timing or control signals at prescribed intervals subsequent to the setting of flip-flop 142 by an output of one of comparators 31 through 36 when the system is placed into operation. Clock signals may be supplied over a suitable clock bus containing clock signals at relatively different frequencies for pulsing or advancing various components of the system in accordance with their specific functional operation within the overall system.

SIGNAL VALUE ACCUMULATOR (FIG. 3)

As was explained above, the two bits from up/down counter 145 and the eight bit contents of output register 112 are coupled as a ten bit signal level representative word to signal value accumulator 4 (FIG. 3), with two bits from up/down counter 145 being the two most significant bits of the word. This ten bit word is coupled to a first input of adder 151, a second input of which is derived via data bus 153. Data bus 153 is coupled to a random access memory (RAM) 154 and to an accumulator register 152. Accumulator register 152 is coupled to the output of adder 151, and is employed to temporarily store the result of the summation of successive samples of the filter outputs prior to their retention in RAM 154 and eventual averaging. Averaging of eight successive samples for a respective filter is effected by a shift-right counter 156. Shift-right counter 156 is coupled to the output of AND gate 157, one input of which is coupled to receive a suitable clock pulse frequency from the clock bus, and another input of which is coupled to divide-by-eight divider 132. As was described above, divider 132 is coupled to the address select line of filter address decoder 135 that is coupled via AND gate 131 to AND gate 41. Since the selective addressing of the filter outputs always begins with filter 21, its address line from filter address decoder 135 is used to define the occurrence of the eighth filter signal sample for which a successive approximation calculation is effected, for that filter 21 and the remaining filters 22 through 26.

Figure 5:
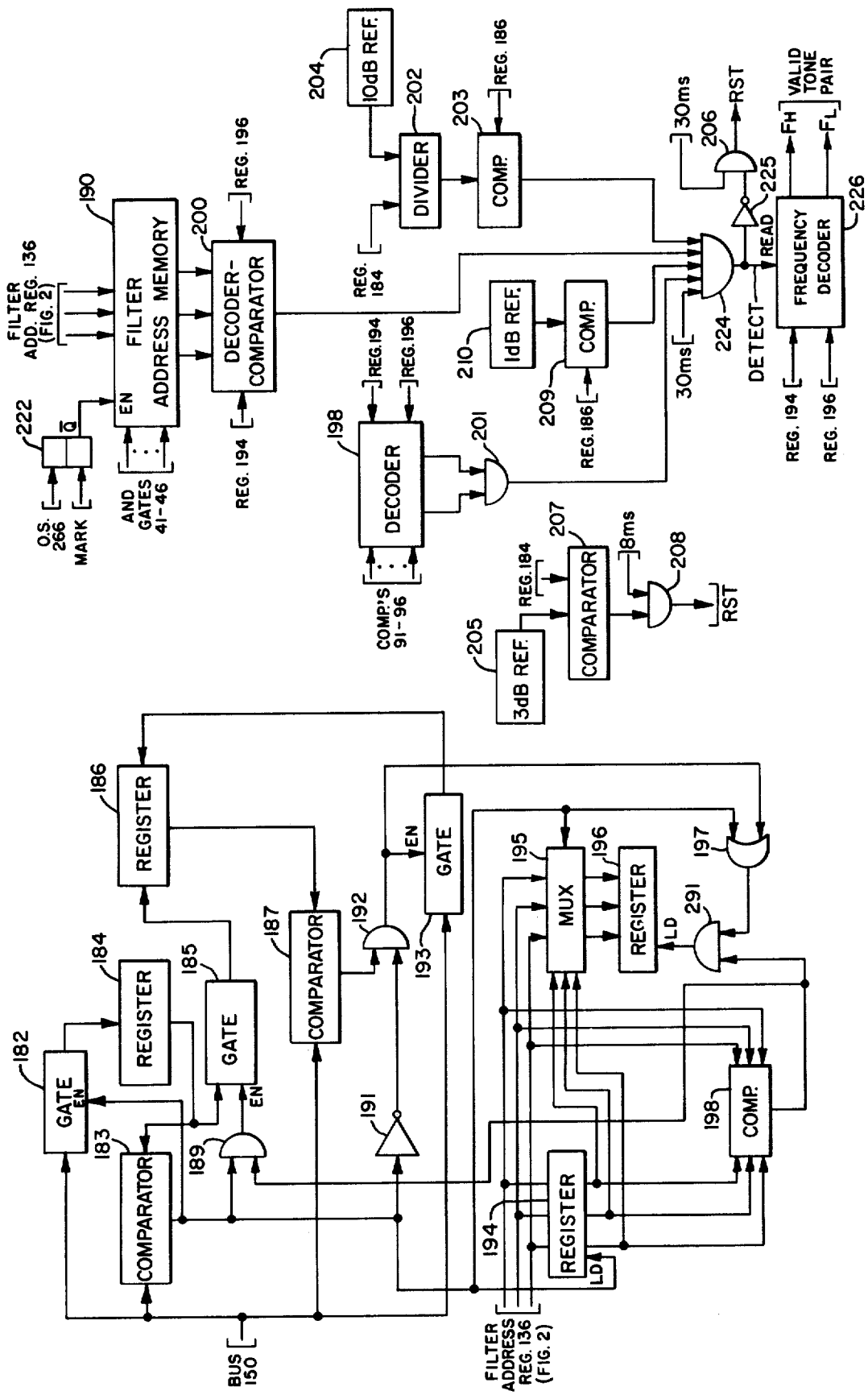
FIG. 5 illustrates the configuration of the up-algorithm calculator of the receiver.

RAM 154 is addressed by a RAM address encoder 161 which encodes the contents of filter address register 136 into a suitable address code for addressing respective memory locations of RAM 154 associated with each filter. The storage or readout of the contents of the memory location in RAM 154 addressed by encoder 161 is controlled by a suitable READ/WRITE control unit 162 which is controlled by timing circuit 143 and responds to the output of OR gate 126 indicating the end of a filter sample operation, such as a successive approximation calculation and, therefore, a new sample value to be added by adder 151 to samples previously accumulated in accumulator register 152 prior to being written in RAM 154. READ/WRITE control unit 162 also couples an enable signal to gate 157 when the total of eight successive samples of a filter's output have been read out of RAM 154 and loaded into accumulator register 152, so that the averaging of the eight samples may proceed. For this purpose, counter 156 counts clock pulses coupled through enabled AND gate 157 and supplies three shift pulses to register 152 to cause the contents of register 152 to be shifted to the right by three binary stages (or divided by eight). When the contents of register 152 have been divided by eight at the generation of a carry by counter 156, gate circuit 163, which is coupled to receive the contents of register 152, is enabled, and the average of the eight successive samples is loaded into an output bus register 163 so as to be coupled onto output bus 150 to be supplied to level profile storage unit 5 (FIG. 4) and algorithm calculators 6 and 7 (FIGS. 5 and 6, respectively). The carry output of counter 156 is further coupled through delay 155 so as to clear register 152 after its contents have been loaded into output bus register 163 and to one input of each of AND gates 171 through 176 in FIG. 4.

LEVEL PROFILE STORAGE UNIT (FIG. 4)

Level profile storage unit 5 includes a comparator 164 coupled to output bus 150 and to the outputs of noise floor reference storage register 113 and up/down counter 145. Comparator 164 compares the signal average value supplied from output bus register 163 with the noise floor threshold and generates a one at its output, which is coupled to demultiplexer 166, if the average value exceeds the noise floor threshold reference, and generates a zero if it does not. Demultiplexer 166 couples the output from comparator 164 to the first stage of one of respective shift registers 71 through 76, via AND gates 171 through 176, and causes the output of comparator 164 to be shifted into the first stage by a suitable clock input (not shown for clarity). The control inputs of demultiplexer 166 are coupled to the filter address code outputs of filter address register 136. Demultiplexer 166 couples a one or a zero, as determined by comparator 164, to that one of shifted registers 71 through 76 designated by the address code coupled to the control inputs of the demultiplexer upon the generation of an output by counter 156 (FIG. 3). Shift registers 71 through 76 are formed of a selected number of stages, e.g. five, the contents of which are summed in respective summing circuits or adders 81 through 86. The outputs of adders 81 through 86 are coupled to one input of respective comparators 91 through 96, second inputs of which are coupled in common to a majority decision reference register 97. Register 97 contains a code representative of a prescribed number relative to which respective totals of the contents of shift registers 71 through 76 are compared to determine whether the outputs of the filters with which shift registers 71 through 76 are associated consistently exceed the noise floor threshold reference. Each time an averaged value coupled from output bus register 163 onto bus 150 exceeds the noise floor threshold reference, comparator 164 supplies a one through demultiplexer 166 to the first stage of the appropriate one of shift registers 71 through 76 and, via a shift clock line (not shown), the contents of that appropriate one of shift registers 71 through 76 are shifted to the right by one stage. Thus, shift registers 71 through 76 contain indications of whether or not a prescribed number (here five) of the most recent signal averages of the respective filter outputs exceed the noise floor threshold reference. To detect whether a majority of these averages is above the noise floor threshold, comparators 91 through 96 compare the five value totals with a reference (e.g. two for five sample averages) stored in register 97. Namely, if the signal level (averaged) at the output of one of filters 21 through 26 is above the noise threshold a majority of the time over the five most recent samples, that one of comparators 91 through 96 which is associated with the filter will generate a one at its output; otherwise a zero is generated. The outputs of comparators 91 through 96 are coupled to a decoder 198 contained in up-algorithm calculator 6 (FIG. 5).

UP-ALGORITHM CALCULATOR

The up-algorithm calculator, shown in FIG. 5, contains a decoder 198 which couples those two of the outputs of comparators 91 through 96 to an AND gate 201 as defined by the contents of a register 194 and a register 196. As will be described below, registers 194 and 196 contain address codes corresponding to the filters the outputs of which are determined by the up-algorithm calculator as being the two tones of a DTMF burst. The output of AND gate 201, which represents whether these two tones have not consistently decreased over a majority of the most recent five sample intervals, is coupled as one input of AND gate 224.

The up-algorithm calculator further includes a bus connection to various components of output bus 150 from output bus register 163; these include comparators 183 and 187, and gate circuits 182 and 193. Comparator 183 has a second input coupled to receive the contents of a highest value register 184, the contents of which are also coupled to gate 185 and subtractor 202. Comparator 187 has a second input coupled to receive the contents of a second highest value register 186, the contents of which are also coupled to subtractor 202 and comparator 209. The output of comparator 183 is a one if the contents of output bus 150 are greater than the contents of register 184 and is a zero otherwise. Similarly, the output of comparator 187 is a one if the contents of output bus 150 is greater than the contents of register 186 and is a zero otherwise. The output of comparator 183 is coupled to the enabling input of gate circuit 182, one input of AND gate 189, and, via inverter 191, to one input of AND gate 192. The output of AND gate 189 is coupled to the enable input of gate circuit 185. AND gate 189 receives a second input from comparator 198. The output of comparator 183 is further coupled to the load/enable input of register 194, the control input of a multiplexer 195, and one input of OR gate 197. The outputs of gate circuits 182 and 185 are coupled as inputs to registers 184 and 186, and when enabled, supply updated digital values to be stored in these registers 184 and 186, respectively.

The output of comparator 187 is coupled to one input of AND gate 192, the other input of which is coupled to the output of inverter 191. The output of AND gate 192 is coupled to one input of gate circuit 193 and a second input of OR gate 197. The output of gate circuit 193 is coupled to second highest values register 186. The output of OR gate 197 is coupled to one input of AND gate 291, the output of which is coupled to the load/enable input of register 196. Depending upon the state of the output of comparator 183, multiplexer switch 195 will couple either the address code supplied from filter address register 136 or the contents of register 194 to register 196. Register 194 is coupled to receive the address code supplied from filter address register 136. The contents of register 194 and the outputs of filter address register 136 are coupled to a comparator 198, the output of which is coupled to AND gate 189, as previously described. The output of comparator 198 is a zero if the address code from filter address register 136 matches that stored in register 194 and is a one otherwise. Comparator 198 prevents registers 184 and 186 from storing signal values derived from the same filter.

The function of the above components is to store the two highest averaged signal sample values of the outputs of filters 21 through 26 as supplied by output bus register 163 and to identify the filters from which the two highest values are derived. The values themselves are stored in registers 184 and 186, while the filter addresses are stored in registers 194 and 196. These values are updated for each filter average value over an eight sample interval supplied by accumulator register 152 to output bus register 163.

Circuitry for determining whether the two highest filter signal values satisfy validity criteria includes a filter address memory 190 and decoder-comparator 200. Address memory 190 is coupled to filter address register 136 and AND gates 41 through 46. Memory 190 is enabled by the Q output of flip-flop 142 in response to the triggering of any of comparators 31 through 36 by an incoming signal which initiates a tone monitoring interval. During the selective addressing of gates 41 through 46 by filter address decoder 135 for the first sample of each filter, memory 190 will store the address output from register 136 corresponding to each comparator that has been triggered by the level output of its associated filter, having been enabled by the $\bar{Q}$ output of flip-flop 222. At the end of the initial sampling of all six filters one-shot 266 sets flip-flop 222 and prevents further storage until the system has been reset and a new mark signal is generated by a new tone burst. Decoder-comparator 200 compares the contents of registers 194 and 190 with the address codes stored in address memory 190 and generates a one if the address codes supplied by registers 194 and 196 find a match in memory 190. This comparison is used as the criterion that the originally identified tones be the same ones that eventually produce the two highest values over the measurement interval.

The validity criteria circuitry also includes divider 202, the output of which is coupled to comparator 203.

Divider 202 has a second input coupled to a register 204 which stores a reference code representative of a prescribed signal level difference (e.g. 10 dB). Divider 202 devides the contents of register 184 by this value. Comparator 203 has a second input coupled to register 184. If the highest signal value stored in register 184 exceeds the second highest value stored in register 186 by at least the prescribed amount stored in register 204, the output of comparator 203 is a one: otherwise, it is a zero. The output of comparator 203 is coupled to one input of AND gate 224.

The up-algorithm calculator further includes a comparator 207 that is coupled to a register 205 and to register 184. Register 205 stores a code representative of a first signal level differential above the noise floor (e.g. 3 dB) to be compared with the contents of register 184. If the contents of register 205 are greater than the contents of register 184 the output of comparator 207 is a one; otherwise, it is a zero. The output of comparator 207 is coupled to one input of AND gate 208, a second input of which is enabled by a timing signal from timing circuit 143 a prescribed interval of time after the beginning of the monitoring interval (e.g. 8 milliseconds after the generation of a mark signal). The purpose of this circuitry is to determine whether a tone can be distinguished in an early portion of the monitoring interval, so that the process may be permitted to continue. If the contents of register 184 are less than an acceptable minimum value stored in register 205 at the end of the 8 millisecond timing interval, the signal level is considered to be too low and the system is reset by the output of AND gate 208. Otherwise, AND gate 208 is disabled and the up-algorithm process continues.

The up-algorithm calculator also includes a comparator 209, a first input of which is coupled to second highest value register 186 and a second input of which is derived from a reference code stored in register 210. Register 210 stores a code representative of a second signal level differential above the noise floor reference (e.g. 1 dB > noise floor ref.). The output of comparator 209 is a one if the input from storage register 186 exceeds the reference code stored in register 210; otherwise, the comparator output is zero. This comparator output is coupled to another input of AND gate 224, an additional input of which is coupled to receive a 30 millisecond timing signal from timing circuit 143. The output of AND gate 224 is coupled to a read/enable input of a frequency decoder 226. Decoder 226 has inputs coupled to the contents of registers 194 and 196 and in response to an enable signal from AND gate 224, supplies a pair of output codes representative of a detected tone pair, one corresponding to the higher tone $F_H$ and the other corresponding to the lower tone $F_L$. The output of AND gate 224 is a "1" upon satisfaction of each of the validity criteria for a tone pair burst. Otherwise, it is "0". This output is coupled, via inverter 225, to one input of AND gate 206. A second input of AND gate 206 is coupled to receive the 30 millisecond timing signal from timing circuit 143. If a valid tone pair is not identified at this time by AND gate 224, AND gate 200 becomes enabled and the system is reset.

DOWN-ALGORITHM CALCULATOR (FIG. 6)

The down-algorithm calculator contains a pair of digital differentiators 271 and 272 coupled to receive two signal averages successively supplied by output bus 150. The function of each differential detector is to monitor the slope of the signal level of one of the high tone or low tone filters as their signal levels decrease at the end of a tone burst. Digital differentiator 271 monitors the bus 150 in response to an enable signal supplied at the output of comparator 213. Comparator 213 is coupled to the contents of filter address register 136 and register 211. Register 211 is coupled to the output of register 194 and is enabled by an output of AND gate 224 which represents the detection of a valid tone pair. Similarly, a register 217 is coupled to the output of register 196 and is enabled by the output of AND gate 224 to load the contents of register 196 therein when a valid tone pair is detected. Registers 211 and 217 store the addresses of the filters corresponding to the upper and lower tones of the detected tone burst and during the down-algorithm it is these filter outputs that are monitored to determine when a tone down condition or tone decreasing condition has terminated. A further register 212 is coupled to receive the contents of the highest value tone stored in register 184 and is enabled to store this value at the occurrence of a detection condition. Once loaded, the contents of register 212 are shifted to the right by one bit to divide the contents of the register by two or to provide a reference value representative of 50% (3 dB) of the peak value of the maximum value stored for the upper tone upon a detection of a valid tone pair. The contents of register 212 are coupled to a comparator 214, a second input of which is coupled to the output register 112. Comparator 214 compres the contents of the output register with the value stored in register 212 and generates a one at its output if the contents of the output register are less than 3 dB of the peak value of the tone the signal output of which provided a maximum amplitude during the up-algorithm detection interval. Otherwise, the output of comparator 214 is a zero. The output of comparator 214 is coupled to one input of AND gate 216. The other input of AND gate 216 is coupled to the output of comparator 213 which generates a one when the contents of the filter address register, which are coupled as one input thereto correspond to the address stored in register 211. Otherwise, the output of comparator 213 is a zero. The output of comparator 213 is further coupled to one input of AND gate 215 in addition to the enable input of digital differentiator 271, referred to previously. The negative slope output of digital differentiator 271 is coupled to the toggle input of a flip-flop 273, the direct reset input of which is coupled to the output of AND gate 224. The toggle input of flip-flop 235 goes high whenever digital differentiator 271 detects a negative slope for a series of values supplied thereto from the output bus 150. The Q output of flip-flop 235 is supplied to one input of AND gate 275. The other input of AND gate 275 is coupled to the positive slope output of differentiator 271. Digital differentiator 271, flip-flop 273, and AND gate 275 monitor the decrease of the output of the upper tone filter. The output of AND gate 275 is a zero during the decrease in the output of the upper tone filter but goes high when the filter output starts to increase (positive slope) indicating an end to the tone down or tone decreasing interval. Similarly, differentiator 272, flip-flop 274, and AND gate 276 monitor the lower tone filter output, with the output of AND gate 276 going high upon a change in slope from negative to positive. The outputs of AND gates 275 and 276 are coupled via OR gate 277 to one input of OR gate 241. The output of OR gate 241 is coupled to one input of AND gate 243. The other inputs of OR gate 241 are coupled to the output of a NAND gate 232, inputs of which are coupled to the outputs of AND gates 215 and 231, and AND gate 216.

AND gates 215 and 231, the outputs of which are coupled to respective inputs of NAND gate 232, are coupled to the outputs of comparators 213 and 218, respectively. The other inputs of these AND gates are respectively coupled to the output of OR gate 121. Comparator 218 compares the contents of the filter address register 136 with the value stored in register 217, the latter register being supplied with the contents of register 196 upon the detection of a valid tone pair in response to the output of AND gate 224. Like register 211, which stores the filter address of the tone the signal level of which is a maximum at the end of the up-algorithm interval, register 217 stores the address of the second highest tone or the lower tone of the tone pair.

The output of comparator 218 is further coupled to the enable input of digital differentiator 272, so that digital differentiator 272 will monitor the signal level corresponding to the lower tone pair supplied over bus 150 as explained above.

For the purpose of enabling AND gate 243, a flip-flop 242 has its reset input connected to the mark of Q output of flip-flop 142 and its set input connected to the output of AND gate 224. Upon the beginning of an up-algorithm detection interval, flip-flop 242 is reset, causing its Q output, which is coupled to one input of AND gate 243, to go low, so that AND gate 243 is not enabled. Upon a detect condition, AND gate 243 becomes enabled by flip-flop 242 and waits for the generation of a tone down condition by one of the above-described components within the down-algorithm calculator.

Having described the constituent components of the DTMF tone receiver of the present invention, its operation will be described with reference to FIGS. 2 through 6, described above, and the signal waveforms shown in FIGS. 7A and 7B.

OPERATION

Figure 7A:
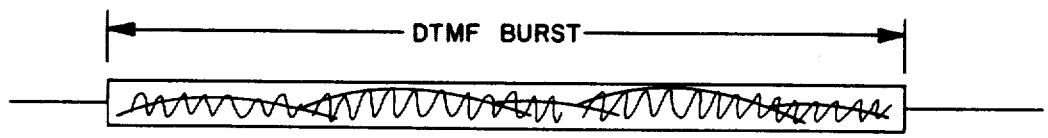
FIGS. 7A and 7B are waveform diagrams useful in explaining the operation of the receiver according to the present invention.

FIG. 7A illustrates an exemplary dual tone multifrequency input to the filter bank 2 containing filters 21 through 26. Contained within a valid tone burst will be a pair of frequencies corresponding to two of the six frequencies to which the filters 21 through 26 are respectively tuned. For the purposes of explaining the invention, it will be assumed that a true DTMF tone burst is supplied to terminal 11 at the input of the system. This 2/6 tone burst may also contain noise signals.

When the system is reset for operation, all the registers are initially cleared, the flip-flops are placed in their appropriate reset or set conditions, and filter address register 136 is reset to 000 identifying the address corresponding to filter 21. Up/down counter 145 is cleared to the code 00 so that the feedback resistance that is placed across the amplifier 102 provides a maximum sensitivity, namely the threshold reference value is a minimum value. With flip-flop 114 being reset, multiplexer 111 couples the output of noise threshold reference storage register 113 to digital-to-analog converter 106, from which a reference voltage is derived, this reference voltage being multiplied by the scaling factor (here, 1/16 in the example chosen) by variable gain amplifier circuit 102 and supplied as a reference for each of the comparators 31 through 36. Incoming signals that are filtered by the filters 21 through 26 are converted into appropriate DC voltages and applied in parallel to the respective inputs of comparators 31 through 36. The moment that a signal level is sufficient to cause the output of one of the filters to exceed the threshold reference supplied by amplifier 101, that particular comparator will toggle, generating a one at its output.

Figure 7B:
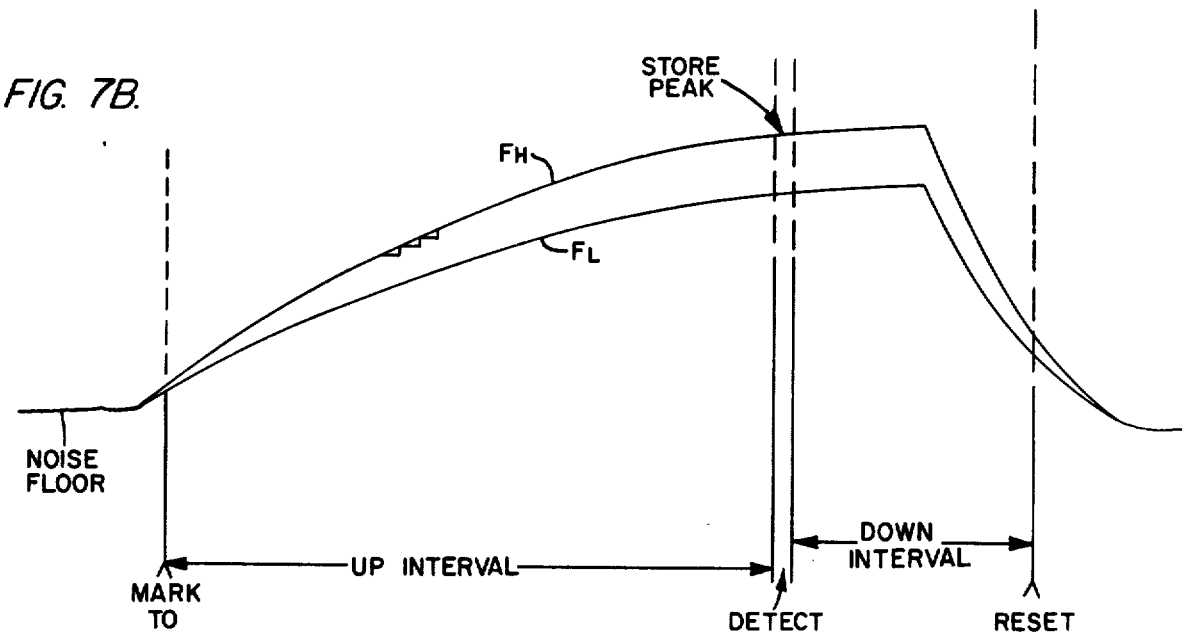

Referring now to FIGS. 2, 7A, and 7B, it will be assumed that a tone burst signal is supplied to input terminal 11. This tone burst signal may contain tones corresponding to the frequencies to which filters 23 and 25 are tuned, for example. As the outputs of the filters rise, eventually they exceed the threshold supplied from amplifier 101, as explained above, causing a one to be generated by the output of the appropriate comparators. This one value is coupled through OR gate 134 to set flip-flop 142. The Q output of flip-flop 142 goes high, generating a mark signal and beginning the up-algorithm and tone detection interval at time t0, as shown in FIG. 7B. When the Q output of flip-flop 142 goes high, AND gate 131 becomes enabled, so that the address of filter 21 presently supplied by filter address register 136, namely address 000, causes filter address decoder 135 to enable AND gate 41. AND gate 41 observes whether or not comparator 31 has supplied an output, namely whether the output of the filter 21 has exceeded the reference threshold supplied from aplifier 101. If it has not, AND gate 41 is not enabled. The output of AND gate 131 is also coupled to the delay 261 which, after a prescribed interval to permit AND gate 41 to set flip-flop 51 if comparator 31 had triggered, enables AND gate 61. Assuming that the filter output of filter 21 is below the reference threshold, flip-flop 51 remains in the reset state so that the output of delay 261 is coupled through AND gate 61 to one of the inputs of OR gate 133. The output of OR gate 133 is coupled via OR gate 126 to AND gate 137, so that a clock signal can be applied to filter address register (counter) 136 and advance or increment the counter by one to the address or code 011 corresponding to filter 22. In addition, the output of OR gate 126 enables gating circuit 127 to cause the contents of registers 112 and 145 (all zeros) to be coupled to signal value accumulator 4 (FIG. 3) wherein they are added to the previously cleared contents of RAM 154 for filter 21 and the still-zero sum is written in RAM 154 under the control of read/write control circuit 162. Filter address decoder 135 decodes the contents of filter address register 136 and now selectively addresses AND gate 42. The above operation is again repeated for AND gate 42 and the subsequent AND gates until a comparator which has toggled is identified. Assuming that filter 23 is the first filter in the sequence of filters 21 through 26 which has toggled, when AND gate 43 is addressed by filter address decoder 135, it will set flip-flop 53 and thereby disable AND gate 63. The delayed signal output of one-shot 263 will not be coupled through OR gate 133 as had occurred for the previous stages. The output of AND gate 43 is coupled to OR gate 121 to set flip-flop 114 and to initiate a successive approximation calculation for the value of the signal supplied from filter 23. Since flip-flop 53 is set, OR gate 123 couples an enable signal to AND gate 124 to cause the application of a series of shift pulses to shift register 122 for purposes of carrying out the successive approximation. Shift register 122, AND gates 115 through 117, output register 112, and digital-to-analog converter 106, in conjunction with comparator 33, now proceed to carry out a successive approximation calculation. The setting of a one in the first position of shift register 122 at the start of the conversion cycle turns on the first switch in the analog-to-digital converter and sets the first stage of the output register 112 to one. The output of the D-A converter 106 is equal to one half the full scale of the D-A converter output voltage inasmuch as the digital-to-analog converter is binary. The output voltage of the digital-to-analog converter 106 is compared directly with the signal voltage supplied by filter 23 to comparator 33. The output of comparator 33 is a binary one if the reference voltage from amplifier 101 is greater than the signal voltage from the filter and is a binary zero if the reference voltage is less than the signal voltage of the filter.

The first bit in the output register may be reset to zero or may remain as a one, depending upon the comparator output. At the application of the next clock pulse through AND gate 124 to shift register 122, the one in the shift register 122 moves to the second bit position at which instant in time the comparison process is repeated, with the exception that the output of the digital-to-analog converter is now either equal to 0.25 or 0.75 of the full scale digital-to-analog converted output; this is dependent upon whether the first bit was reset to zero or remained as a one, respectively. The above process is repeated until eight bits have been successively processed, or the contents of shift register 122 have been successively clocked to its full eight positions, at which time divider 125 generates an output, resetting flip-flop 114 and thereby flip-flops 51 through 56, and enabling AND gate 137, via OR gate 126, so that the clock input may increment or advance the contents of filter address register 136. The output of divider 125 is further coupled through OR gate 126 to gating circuit 127 so that the contents of output register 112 will be supplied together with the two bit code in up/down counter 145, to adder 151 in the signal value accumulator 4. The output of divider 125 further resets shift register 122 and places a one in its first position, in the same manner as discussed above for the previous calculation. The contents of up/down counter 145 are combined with the contents of output register 112 to form a ten bit code supplied to one of the inputs of adder 151. Output register 112 is then cleared by a reset/clear signal (not shown) so that it will be ready to process another successive approximation calculation.

Within the signal value accumulator 4, read/write control circuit 162 observes the end of the successive approximation calculation for the signal value at the output of filter 23 and causes the contents of random access memory 154 to be coupled over the data bus 153 to the other input of adder 151. With the contents of RAM 154 initially cleared, the signal level calculated by the successive approximation process described above is added to the zero contents of the memory 154 and then coupled to accumulator register 152. The output of divider 132 remains low, since the filter address register is still within the first sweep of the filters so that AND gate 157 is not enabled. The contents of accumulator register 152 are therefore not modified and read/write control circuit 162 causes the (non-zero) contents of register 152 to be applied to data bus 153 and loaded into memory 154.

At the next clock pulse applied to AND gate 137, filter address register 136 advances to the next filter address tage, namely it enables AND gate 44. If the output of filter 24 is above the threshold level supplied from amplifier 101, the above-described successive approximation calculation will proceed for that filter and be stored in memory 154. Otherwise, filter address register 136 advances to the next comparator 35 and then to the following comparator 36 with appropriate successive approximation calculations being rapidly processed for each filter output sample during the sweep by filter address register 136.

When filter address register 136 recycles, it again addresses AND gate 41. The above sequence of examination of comparator outputs and successive approximation calculations is repeated for the next succeeding seven samples of the outputs of the filters. For each successive sample, when read/write control 162 reads the contents of the appropriate memory location as defined by address encoder 161, it adds the previously stored contents within the memory 154 to the contents of output register 112 and up/down counter 145 through the operation of adder 151 and loads the summation value in accumulator register 152.

Eventually, when a summation of eight successive samples for the filter outputs have been accumulated in register 152, filter address register 136 will have addressed the first AND gate or first filter stage in the sequence, namely AND gate 41, eight times so that divider 132 at this time will have counted up to eight address signals and will supply an output to one input of AND gate 157. AND gate 157, in response to a signal from read/write control circuit 162 after the contents of memory 154 have been read out, added to the contents of the output register 112, and stored in accumulator register 152, will permit the shift pulse input thereto to be applied to counter 156. Counter 156 will count the shift pulses applied to AND gate 157 and shift to the right the contents of accumulator register 152 by three bit positions, thereby effectively dividing the contents of register 152 by eight. Since eight samples have been processed, this division by eight provides an average value of the eight samples. The average value is loaded into output bus register 163 to be applied to output bus 150. The contents of output bus 150 are coupled to comparator 164 (FIG. 4) to up-algorithm calculator 6 (FIG. 5) and down-algorithm calculator 7 (FIG. 6). Within the level profile storage unit 5, comparator 164 observes the value supplied by output bus register 163 for each particular filter or tone and generates an output if the average value exceeds the noise floor reference threshold and generates a zero at its output if the average value fails to exceed the noise floor reference threshold. By using an average of a prescribed number of successive samples, the influence of noise which might lead to an erroneous indication that a tone is being applied to a filter is substantially reduced.

Demultiplexer 166 steers or applies the output of comparator 164 to one of shift registers 71 through 76 which correspond to the filter being presently addressed.

In the example chosen, it will be assumed that only the filters corresponding to the tones within the burst have produced an average value which exceeds the noise threshold reference value, so that the first stage of each of shift register 73 and 75 is loaded with a one but the first stage of the other shift registers is loaded with a zero.

The contents of the shift registers 71 through 76 are unimportant at this time because the ultimate decision as to whether or not a valid tone pair has been detected in accordance with the contents of these registers depends upon the expiration of a prescribed interval of time as controlled by timing control circuit 143. Since no enabling signals corresponding to the expiration of prescribed periods of time (e.g. 8 milliseconds, 30 milliseconds) within the investigation or tone detection process have been generated, the effects of the up-algorithm calculator and the down-algorithm calculator are inhibited.

Still, within the up-algorithm calculator, registers 184 and 186 are loaded with the maximum and second maximum values of the averages supplied by output bus register 163 for those tone filters within the filter bank 2. More specifically, assuming that filter 23 is the first filter the output of which provide a significant average which exceeds the noise floor threshold, at the time the contents of the bus 150 correspond to the average value representative of the output of filter 23, comparator 183 will detect that the contents of bus 150 exceed the cleared contents of register 184. The output of comparator 183 will go high, enabling gate circuit 182 and cause the loading of the contents of bus 150 into register 184. Comparator 187 also compares the contents of bus 150 with the contents of cleared register 186 and enables one of the inputs of AND gate 192. However, since comparator 183 generates a one when the contents of the bus 150 exceed the contents of register 184, inverter 191 disables AND gate 192 which, in turn, disables gate circuit 193 so that the contents of bus 150 cannot be loaded into register 186. In this manner, the maximum signal value will be loaded into register 184 while the next highest value will be loaded into register 186.

The address of the filter whose maximum value has been stored in register 184 is loaded into register 194 in response to a load enable signal from the output of comparator 183. The contents of the outputs of filter address register 136 which are coupled to register 194 and to multiplexer 195 are available to be loaded into either registers 194 and 196. Since the output of comparator 183 is high, register 194 will be loaded with the address of the filter whose signal value has been loaded into register 184.

The output of comparator 183 is further coupled to multiplexer switch 195 and OR gate 197 to cause multiplexer switch 195 to couple the previously stored contents of register 194 to the inputs of register 196. When a new value is loaded into register 184, and a new address is loaded into register 194, the address previously stored in register 194 is transferred through register switch 195 to register 196. In this case, whatever value has previously been the second largest and has been switched into register 186 will have its address correspondingly switched into address register 196. Comparator 198 compares the contents of register 194 and the address code from the filter address register 136 and prevents the loading of the register 186 with the contents of register 184 if the addresses match. AND gate 291 will also prevent the loading of register 196 with the address stored in register 194 so that there will be no duplication of storage of addresses, just as there is no duplication of the storage of signal values for the same address.

When a subsequent signal average value from accumulator register 152 is loaded in register 163 and placed on bus 150, the above-described comparison operation again takes place. If the new value on the bus 150 exceeds the contents of register 184, the contents of register 184 will be transferred to register 186 and the contents of bus 150 will be placed within register 184. Similarly, the addresses of the filters which produced these values will be transferred into registers 194 and 196, respectively. If the contents of the bus 150 is less than the value in register 184 but exceeds that in register 186, then comparator 187 will cause the loading of the contents of the bus 150 into register 186 and multiplexer switch 195 will couple the address from the filter address register into register 196.

The above sequences of operations continue to take place as successive sample values of the respective filters are calculated and sample averages are monitored by up-algorithm calculator 6 and level profile storage unit 5. As is shown in FIG. 7B, for a valid tone pair, the outputs of the filters that are tuned to the tones of the burst will increase in a gradual manner over the up-algorithm interval. At the end of a brief interval of time, for example an eight millisecond interval, timing control circuit 143 will supply an enabling signal to AND gate 208. During the storage of signal values in register 184 and 186, arithmetic evaluations or comparisons of these values are carried out by divider 202, and comparators 203, 207, and 209. At the eight millisecond time slot, the value stored in register 184 is supplied to comparator 207 to be compared with the 3 dB differential value stored in register 205. Assuming that the tone level is greater than 3 dB, comparator 207 will produce zero at its output to be supplied to AND gate 208. The eight millisecond clock from timing control circuit 143 is coupled to the other input of AND gate 208. If the output of comparator 207 is a zero, AND gate 208 will not be enabled, so that a zero will be produced at its output, thereby preventing resetting of the system. If the tone level is less than 3 dB above the noise floor AND gate 208 will be enabled and the system will be reset.

Assuming that the tone level is greater than 3 dB above the noise floor, the above events continue to occur, and the signal amplitude outputs of the filters of the tones of interest, here filters 23 and 25 for the example chosen, continue to increase as shown in FIG. 7B. After a time interval on the range of 30 milliseconds, from the beginning of the tone detection interval, an enabling signal is supplied from timing control circuit 143 to AND gate 206 and AND gate 224. An indication of whether or not the level of the lower tone is within 10 dB of the upper tone is provided by comparator 203; assuming that the differential between the two tones is satisfactory, comparator 203 produces a one at its output. At this time, the value of the second maximum level as supplied to comparator 209 is compared relative to the numerical reference value stored in register 210. The second maximum signal, the lower level tone $F_L$, shown in FIG. 7B, must be at least 1 dB above the noise floor reference as indicated at the output of comparator 209 and within 10 dB of the upper level tone as indicated by comparator 203. Assuming that these criteria are satisfied, two of the inputs to AND gate 224 will be enabled.

Further criteria for determining as to whether or not the tone pair is valid is that a prescribed number of the most recent samples have indicated that the tones have not consistantly decreased. A signal indicative of this criterion is supplied from level profile storage unit 5. Specifically, the filter address codes of the upper and lower frequency tones of interest are coupled to decoder 198 from registers 194 and 196, respectively. These code inputs cause decoder 198 to couple the appropriate inputs from comparators 91 through 96 to the two outputs supplied to AND gate 201. If the average values for the successive samples supplied by accumulator register 152 have not consistantly decreased, the contents of the shift registers 73 and 75 will exceed the majority reference stored in register 97, so that AND gate 201 will be enabled, thereby supplying another enabling input to AND gate 224. The final criterion is that this tone pair is comprised of tones initially observed. A one output from decoder-comparator 200 to this end supplies the final enabling input to AND gate 224. Thus, at the approximately 30 millisecond time interval, AND gate 224 will become enabled if the above criteria are satisfied and the output of this AND gate indicates that a valid tone pair has been detected. The output of AND gate 224 is supplied to frequency decoder 226, which translates or converts the address codes supplied from filter address register 136 and stored in registers 194 and 196 into appropriate digital codes to be used by down-stream processing circuitry for identifying the tone pair.

If any of the above criteria had not been satisfied at the second observation, namely at the 30 millisecond time slot, the output of AND gate 224 would have been low, causing inverter 225 to generate a reset signal and the system would have been reset.

Once a valid tone pair has been detected, within down-algorithm calculator 7 (FIG. 6), registers 211 and 217 are loaded with the addresses corresponding to the frequency pair as provided by filter address register 136, and the maximum value of the upper tone is stored in register 212. This value is divided by two, by a shift of the contents of register 212 to the right by one place, as noted above, so that one of the inputs of comparator 214 will be representative of half or 50% of the peak value of the upper level and stored at the detect time.

As is shown in FIG. 7B, eventually after the tone burst terminates, the outputs of the filters of interest begin to decrease. If any of the tones drops below the threshold level, the output of the appropriate AND gate among the series or group of AND gates 41 through 46 will be zero at the time that it is addressed, so that one of AND gates 215 and 231 will not be enabled and NAND gate 232 will supply a reset signal to OR gate 241, the output of which is coupled to AND gate 243. Generation of a detect signal at the indication of a valid tone pair will have set flip-flop 242 so that the other input of AND gate 243 is enabled, whereby AND gate 243 causes a resetting of the system and preparation of the circuitry for observation or monitoring of further tone bursts.

In addition to the loss of tone, comparator 214 monitors each time that the filter whose peak value has been stored, namely the high tone, is addressed by filter address register 136, to enable AND gate 216. As long as the value stored in the output register corresponding to this tone during a successive approximation calculation is greater than 50% of its peak value as stored in register 212, the output of comparator 212 will be a zero, preventing an output from being supplied through AND gate 216. However, if the decreasing upper tone level drops below 50% of its peak value, AND gate 216 becomes enabled and a reset signal will be coupled through OR gate 241 to AND gate 243 causing a resetting of the system.

As a third possibility, as was explained previously, if the level of one of the decreasing tones begins to increase so that there will be a reversal in the sign of the slope of the signal value, one of differentiators 271 and 272 will enable one of AND gates 275 and 276, so that OR gates 277 and 241 will enabled AND gate 243. AND gate 243 thereby causes the system to be reset so that a new tone burst may be monitored.

In the foregoing description of the tone detection system in accordance with the present invention, an exemplary implementation of one digital configuration that may be used to monitor a tone burst and to identify the constitutent tone pair of which the burst is comprised has been presented, and it should be understood that this exemplary implementation is not limitative of the invention, and other suitable configurations that carry out the signal level monitoring and algorithm analyses described above may be employed. Advantageously, with the processing speeds available using present day digital components, the rate at which the above-described successive approximation and sampling operations may be carried out enables the filter outputs to be monitored in effectively a simultaneous fashion. This is particularly true where, in place of the particular digital logic configuration explained above, the invention may be carried out by the combination of a successive approximation digital analog conversion scheme coupled to respective comparators that receive the outputs of the individual tone filters and a suitably programmed computer, such as a commercially available microprocessor. Just as with the particular exemplary digital component configuration shown in FIGS. 2 through 6, the computer-controlled configuration monitors the comparator outputs on a continuous basis and dynamically adjusts the gain of a variable gain amplifier which is coupled between the output of the digital-analog converter and the reference input of each comparator as it maintains a history profile of the filter signal levels and makes a determination as to the identity of a 2/6 tone burst using the validity criteria explained above. The effectively simultaneous monitoring of all the filter outputs is especially applicable to such an implementation employing a suitably programmed digital computer, wherein multi word data formats handled by the computer make possible the processing of information for a plurality of simultaneously provided inputs.

While I have shown and described several embodiments in accordance with the present invention, it is understood that the same is not limited thereto but is susceptible of numerous changes and modifications as known to a person skilled in the art and I therefore do not wish to be limited to the details shown and described herein but intend to cover all such changes and modifications as are obvious to one of ordinary skill in the art.

What is claimed:
1. A system for detecting the presence of a tone burst and identifying the frequency signals contained within said tone burst, comprising:
 an input terminal to which said tone burst is applied;
 a plurality of filter circuits connected to said input terminal and tuned to respectively different frequencies including the frequency signals of which said tone burst may be comprised;
 first means, connected to the outputs of said filter circuits, for monitoring the outputs of said filter circuits and producing a plurality of signals respectively representative of the outputs thereof;
 second means, coupled to said first means, for comparing the levels of signals produced by said first means, which are representative of the receipt of frequency signals, with a first set of reference criteria, at a prescribed interval of time subsequent to the initial production of signals by said first means;

third means, coupled to said first means, for producing a set of signals representative of a history profile of the signals produced by said first means for each of said respective filters; and fourth means, coupled to said first, second and third means, for identifying the frequency signals which are contained within a valid tone burst, in response to the output of said second means indicating that the levels of signals produced by said first means which satisfy said first set of reference criteria correspond to those frequency signals for which the sets of signals produced by said third means satisfy a prescribed history profile.

2. A system according to claim 1, wherein said first means comprises a successive approximation digital-to-analog converter circuit selectively coupled to the outputs of each of said filter circuits, and control means, coupled to said converter, for selectively coupling the output of each filter thereto and thereby causing the generation of a digital code representative of a sampled output of each respective filter.

3. A system according to claim 2, wherein said first means further comprises means, coupled to said control means, for accumulating a plurality of said digital codes for each respective filter over a prescribed sampling interval and generating respective digital signals for each of said filter circuits, representative of the average values of said pluralities of digital codes over said prescribed sampling interval.

4. A system according to claim 3, wherein said second means includes means for storing those digital signals generated by said accumulating means which have the two highest average values over a sampling interval and identifying the corresponding pair of filters from which said highest average values have been produced.

5. A system according to claim 3, wherein said second means includes means for storing those digital signals generated by said accumulating means which have attained the two highest average values at said prescribed interval of time and identifying the corresponding pair of filters from which said highest average values have been produced.

6. A system according to claim 5, wherein said second means further includes means for comparing the identities of said corresponding pair of filter circuits with the identities of the filter circuits for which said first means produced outputs indicative of the presence of signals at the initial production of signals by said first means and generating a criterion satisfaction signal in response to a match therebetween.

7. A system according to claim 5, wherein said second means includes means for comparing one of said stored digital signals with a digital reference code representative of a signal level differential above a preselected filter output reference threshold, and generating a criterion satisfaction signal in response to said stored digital signal exceeding said signal level differential.

8. A system according to claim 5, wherein said second means includes means for comparing the difference between said stored digital signals having said two highest values with a first predetermined digital code as one of the reference criteria of said set and generating a first criterion satisfaction signal in response to said difference not exceeding said first predetermined digital code.

9. A system according to claim 8, wherein said second means further includes means for comparing one of said stored digital signals with a second predetermined digital code representative of a signal level differential above a preselected filter output reference threshold, and generating a second criterion satisfaction signal in response to said stored digital signal exceeding said signal level differential.

10. A system according to claim 9, wherein said first set of reference criteria includes the generation of said first and second criterion satisfaction signals by said second means.

11. A system according to claim 9, wherein said second means further includes means for comparing the identities of said corresponding pair of filter circuits with the identities of the filter circuits for which said first means produced outputs indicative of the presence of signals at the initial production of signals by said first means and generating a third criterion satisfaction signal in response to a match therebetween.

12. A system according to claim 11, wherein said first set of reference criteria includes the generation of said first, second, and third criterion satisfaction signals by said second means.

13. A system according to claim 2, wherein said successive approximation digital-to-analog converter circuit includes a plurality of comparator circuits coupled to compare the outputs of each of said respective filter circuits with a reference input voltage, each of said comparator circuits generating a prescribed output upon the output of the filter coupled thereto exceeding said reference input voltage.

14. A system according to claim 13, wherein said successive approximation digital-to-analog converter circuit further includes a variable gain reference input voltage supply circuit from which said reference input voltage is derived, and means, responsive to said digital code, for controllably varying the gain of said reference input voltage supply circuit, and thereby the reference input voltage coupled to said plurality of comparator circuits.

15. A system according to claim 14, wherein said first means further comprises means, coupled to said control means, for accumulating a plurality of said digital codes for each respective filter over a prescribed sampling interval and generating respective digital signals for each of said filter circuits, representative of the average values of said pluralities of digital codes over said prescribed sampling interval.

16. A system according to claim 15, wherein said second means includes means for storing those digital signals generated by said accumulating means which have attained the two highest average values at said prescribed interval of time and identifying the corresponding pair of filters from which said highest average values have been produced.

17. A system according to claim 1, further comprising fifth means, coupled to said first means and said fourth means, for monitoring the decrease in the outputs of the filter circuits corresponding to said identified frequency signals and causing said system to be reset whereby said first means begins monitoring the outputs of said filter circuits for a new tone burst.

18. A system according to claim 17, wherein said fifth means includes means for causing said system to be reset in response to a change in the polarity of the slope of the output of one of said filter circuits, corresponding to said identified frequency signals, and the signal level output of which has been decreasing.

19. A system according to claim 17, wherein said fifth means includes means for causing said system to be reset upon the output of one of said filter circuits corresponding to said identified frequency signals dropping to a prescribed level.

20. A system according to claim 19, wherein said fifth means includes means for causing said system to be reset in response to a change in the polarity of the slope of the output of one of said filter circuits, corresponding to said identified frequency signals, and the signal level output of which has been decreasing.

21. A system according to claim 17, wherein said first means comprises a successive approximation digital-to-analog converter circuit selectively coupled to the outputs of each of said filter circuits, and control means, coupled to said converter, for selectively coupling the output of each filter thereto and thereby causing the generation of a digital code representative of a sampled output of each respective filter.

22. A system according to claim 21, wherein said successive approximation digital-to-analog converter circuit includes a plurality of comparator circuits coupled to compare the outputs of each of said respective filter circuits with a reference input voltage, each of said comparator circuits generating a prescribed output upon the output of the filter coupled thereto exceeding said reference input voltage.

23. A system according to claim 22, wherein said successive approximation digital-to-analog converter circuit further includes a variable gain reference input voltage supply circuit from which said reference input voltage is derived, and means, responsive to said digital code, for controllably varying the gain of said reference input voltage supply circuit, and thereby the reference input voltage coupled to said plurality of comparator circuits.

24. A method for detecting the presence of a tone burst and identifying the frequency signals contained within said tone burst, comprising the steps of:
(a) applying said tone burst to a plurality of filter circuits tuned to respectively different frequencies including the frequency signals of which said tone burst may be comprised;
(b) monitoring the outputs of said filter circuits and producing a plurality of signals respectively representative of the outputs thereof;
(c) comparing the levels of signals produced by said monitoring step (b), which are representative of the receipt of frequency signals, with a first set of reference criteria, at a prescribed interval of time subsequent to the initial production of signals by said monitoring step (b);
(d) producing a set of signals representative of a history profile of the signals produced by said monitoring step (b) for each of said respective filters; and
(e) identifying the frequency signals which are contained within a valid tone burst, in response to the output of said comparing step (c) indicating that the levels of signals produced by said monitoring step (b) which satisfy said first set of reference criteria correspond to those frequency signals for which the sets of signals produced by said producing step (d) satisfy a prescribed history profile.

25. A method according to claim 24, further comprising the step of:
(f) monitoring the decrease in the outputs of the filter circuits corresponding to said identified frequency signals and beginning the monitoring of the outputs of said filter circuits for a new tone burst.

26. A method according to claim 25, wherein said monitoring step (f) further includes beginning the monitoring of the outputs of said filters in response to a change in the polarity of the slope of the output of one of said filter circuits, corresponding to said identified frequency signals, and the signal level output of which has been decreasing.

27. A method according to claim 25, wherein said monitoring step (f) includes beginning the monitoring of the outputs of said filters upon the output of one of said filter circuits corresponding to said identified frequency signals dropping to a prescribed level.

28. A method according to claim 27, wherein said monitoring step (f) includes beginning the monitoring of the output of said filters in response to a change in the polarity of the slope of the output of one of said filter circuits, corresponding to said identified frequency signals, and the signal level output of which has been decreasing.

29. A method according to claim 24, wherein step (b) comprises the step of monitoring the outputs of said filter circuits effectively simultaneously and producing said plurality of output signals as a digital code representative of the effectively simultaneously produced outputs of said filter circuits.

30. A method according to claim 24, wherein said monitoring step (b) comprises applying the outputs of said filter circuits to a successive approximation digital-to-analog converter circuit, and selectively coupling the output of each filter thereto and thereby causing the generation of a digital code representative of a sampled output of each respective filter.

31. A method according to claim 30, wherein said successive approximation digital-to-analog converter circuit includes a plurality of comparator circuits coupled to compare the outputs of each of said respective filter circuits with a reference input voltage, each of said comparator circuits generating a prescribed output upon the output of the filter coupled thereto exceeding said reference input voltage.

32. A method according to claim 31, wherein said successive approximation digital-to-analog converter circuit includes a variable gain reference input voltage supply circuit from which said reference input voltage is derived, and further including the step of controllably varying the gain of said reference input voltage supply circuit, in response to said digital code, and thereby the reference input voltage coupled to said plurality of comparator circuits.

33. A method according to claim 30, wherein said monitoring step (b) further comprises accumulating a plurality of said digital codes for each respective filter over a prescribed sampling interval and generating respective digital signals for each of said filter circuits, representative of the average values of said pluralities of digital codes over said prescribed sampling interval.

34. A method according to claim 33, wherein said comparing step (c) includes storing those digital signals, generated during said accumulating step, which have the two highest average values over a sampling interval and identifying the corresponding pair of filters from which said highest average values have been produced.

35. A method according to claim 33, wherein said comparing step (c) further includes storing those digital signals generated during said accumulating step, which have attained the two highest average values at said prescribed interval of time and identifying the corresponding pair of filters from which said highest average values have been produced.

36. A method according to claim 35, wherein said comparing step (c) further includes the steps of comparing the identities of said corresponding pair of filter circuits with the identities of the filter circuits for which said first means produced outputs indicative of the presence of signals at the initial production of signal during said monitoring step (b) and generating a criterion satisfaction signal in response to a match therebetween.

37. A method according to claim 35, wherein said comparing step (c) includes the steps of comparing the difference between said stored digital signals having said two highest values with a first predetermined digital code as one of the reference criteria of said set and generating a first criterion satisfaction signal in response to said difference not exceeding said first predetermined digital code.

38. A method according to claim 35, wherein said comparing step (c) includes the steps of comparing one of said stored digital signals with a digital reference code representative of a signal level differential above a preselected filter output reference threshold, and generating a criterion satisfaction signal in response to said stored digital signal exceeding said signal level differential.

39. A method according to claim 37, wherein said comparing step (c) further includes the steps of comparing one of said stored digital signals with a second predetermined digital code representative of a signal level differential above a preselected filter output reference threshold, and generating a second criterion satisfaction signal in response to said stored digital signal exceeding said signal level differential.

40. A method according to claim 39, wherein said first set of reference criteria includes the generation of said first and second criterion satisfaction signals in response to said comparing step (c).

41. A method according to claim 39, wherein said comparing step (c) further includes the steps of comparing the identities of said corresponding pair of filter circuits with the identities of the filter circuits for which said monitoring step (b) produced outputs indicative of the presence of signals at the initial production of signals during said monitoring step (b) and generating a third criterion satisfaction signal in response to a match therebetween.

42. A method according to claim 41, wherein said first set of reference criteria includes the generation of said first, second, and third criterion satisfaction signals in response to said comparing step (c).

* * * * *